INVENTOR.
JOHN J. SMERKE

United States Patent Office 2,762,385
Patented Sept. 11, 1956

2,762,385

CONTROLLERS HAVING RESET ACTION

John J. Smerke, Willow Grove, Pa., assignor to Leeds and Northrup Company, Philadelphia, Pa., a corporation of Pennsylvania Application April 11, 1950, Serial No. 155,299

26 Claims. (Cl. 137—86)

This invention relates to control systems for stabilization of temperature, pressure, flow, pH or other physical, chemical or electrical conditions for brevity herein termed the controlled variable.

Many automatic control systems afford what is termed "reset action" which is an action in which the final control element is moved at a speed proportional to the extent of proportional-position action. This term applies only to a multiple action including proportional-position action. Reset action precludes stabilization of the controlled variable at a point or magnitude other than the selected control point. For such purpose, many control systems include a hydraulic, pneumatic or electrical resistance whose setting determines the rate of the reset action. Reset rate is the number of times per minute that the effect of the proportional-position action upon the final control element is repeated by the reset action. To avoid excessive overshoot of or hunting about the control point for rather small changes of the controlled variable, the aforesaid setting corresponds with a high resistance for slow reset action. However, for large abrupt changes of the controlled variable, such for example as incident to a sudden large increase in load, the resistance setting must be substantially reduced by an operator for rapid return of the controlled variable toward the control point and must be subsequently returned to or toward its original high value as the control point is approached in order to avoid overshooting.

In accordance with the present invention, the valve, slidewire or equivalent reset-action resistance of such control systems is shunted by a path for flow of fluid or current, as the case may be, whose resistance varies inversely as a non-linear function of the applied fluid or electrical pressure, thus automatically to increase the rate of the reset action for increased deviation of the controlled variable from the control point.

Specifically and in accordance with one form of the invention, the reset control valve of a pneumatic controller is shunted by at least one auxiliary path each including a valve, or equivalent flow resistance, and a liquid trap serving as a bias to prevent flow until the pressure drop across the first valve exceeds a predetermined magnitude. Thus, for small deviations of the controlled variable, the proportionality factor between deviation and reset rate is low, insuring stability, but for larger deviations, during which there is flow in one or more of the supplemental paths, the proportionality factor is temporarily automatically increased for rapid reduction of the deviation.

For a more detailed understanding of the invention and for illustration of its embodiment in typical control systems, reference is made to the accompanying drawings, in which.

Figure 1:
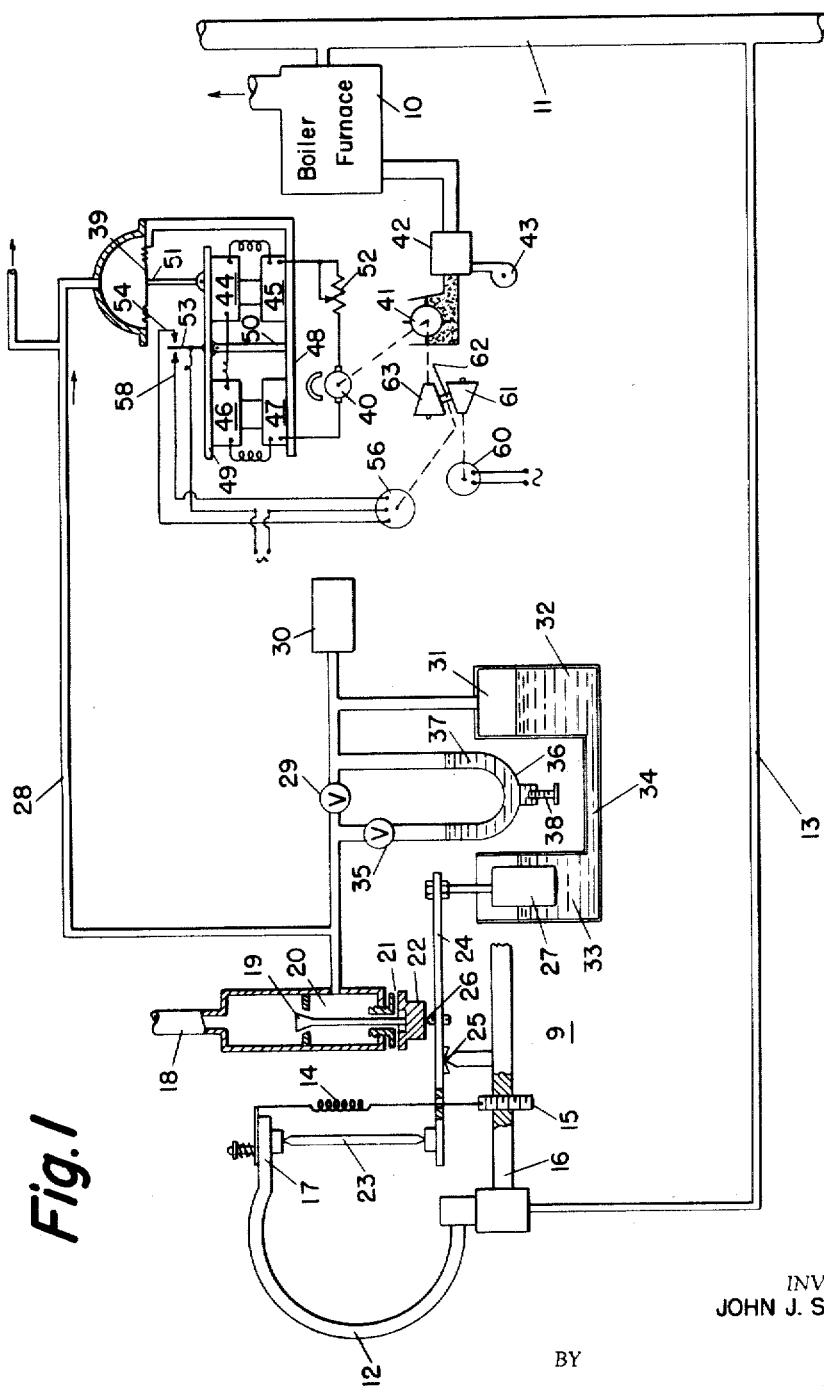
Fig. 1 is a diagrammatic view of a pneumatic control system embodying the invention.

In Fig. 1, there is shown the manner in which the invention may be applied to a pneumatic controller 9 of type shown in copending application Serial No. 151,650, filed March 24, 1950 now U. S. Letters Patent 2,679,979. In the particular arrangement shown in Fig. 1, the controller 9 regulates the flow of fuel to steam generator 10 to maintain constant the pressure in steam-header 11 connected thereto. Bourdon tube 12 connected to header 11 by pipe 13 expands in accordance with the steam pressure against the tension of spring 14 which is adjustable by screw 15 threaded in frame 16.

As will be described more fully hereinafter, a control quantity, namely, air-loading pressure, varying with the position of outer end 17 of Bourdon tube 12 is varied automatically to control the flow of fuel to one or more steam generators or boilers 10 to maintain the header pressure constant. When it is desired to maintain a certain normal steam pressure in header 11, screw 15 is adjusted to a corresponding position. The position of screw 15 may be considered to establish the reference value or control point of the condition being controlled.

Compressed air from any suitable source, not shown, enters through pipe 18 and valve 19 to chamber 20 from which it may leak to atmosphere through a restricted passageway or orifice 21. Cap or valve 22 movable with valve 19 controls the flow of air from passageway 21, reducing this leakage flow as valve 19 is moved in an opening direction, thereby increasing the air pressure in chamber 20 and increasing the leakage flow from passageway 21 when valve 19 is moved in closing direction, thereby cumulatively decreasing the pressure of air in chamber 20. This throttle-and-bleed arrangement provides a sensitive adjustment of air pressure in chamber 20 in response to slight movements of valve 19. As will hereinafter appear, the pressure in chamber 20 is the control force utilized to vary the rate of generation of steam by one or more boilers.

The free end 17 of Bourdon tube 12, upon decrease of header pressure, pushes rod 23 downwardly to tilt lever 24 about its pivot 25 to raise the master control valve 19 through pivot 26 bearing against bleeder cap 22. If the steam pressure in header 11 increases, the free end 17 of Bourdon tube 12 is raised against the tension of spring 14, thereby permitting push rod 23 and the left-hand end of lever 24 to be raised by counterweight 27 carried by the right-hand end of lever 24. Thus, increase in steam pressure permits valve 19 to close slightly, thereby decreasing the supply of air to chamber 20 and simultaneously increases leakage through passageway 21 further to reduce the air pressure in chamber 20.

The air in chamber 20, referred to for convenience as loading-air and its pressure as air-loading pressure, is thus varied inversely in pressure with the steam pressure in header 11. Chamber 20 communicates through pipes 28 with similar fuel-control units, one of which is specifically described hereinafter. As thus far discussed, the air-loading pressure in pipe 28 varies over a range of values in variable accordance with deviations of the steam pressure in header 11 as determined by the position of screw 15. It results in what is commonly known as proportional control of the steam pressure. The modification of this air-loading pressure in accordance with the past history of these deviations to achieve reset action will now be described.

It is now assumed that the load on boiler 10 is increased, thus requiring increase in the fuel flow to boiler 10 to maintain constant the steam pressure in header 11. This increase in fuel flow will require that there be a corresponding increase in air-loading pressure in pipe 28, as will be described hereinafter, from its previous value corresponding to the steam pressure fixed by adjustment of screw 15. The necessary increase in air-loading pressure will be initiated by unavoidable decrease in steam pressure in header 11 resulting from increased load on boiler 10. This decrease in steam pressure increases the loading-air pressure in chamber 20, as previously described, but without the reset action later described the steam pressure would be stabilized, below its normal value, for a higher rate of feed of fuel. The purpose of the reset action, which continues to act until pressure returns to normal, is to preclude such stabilization at subnormal pressure by the proportional control action alone.

The increase in loading-air pressure in chamber 20 due to the proportional control action will cause control air to flow therefrom through valve 29 into tank 30, thereby increasing the air pressure in tank 30 and in compartment 31 with consequent fall of the level of mercury column 32 and rise of the level of mercury column 33 connected thereto by passageway 34. The rise in mercury column 33 increases the buoyant force on counterweight 27 of controller 9 to allow spring 14 to tilt lever 24 further to open valve 19, thereby further increasing the air pressure in chamber 20. For the present, valve 35 in a path in shunt to valve 29 is considered to be closed. It should be noted that this effect upon the mercury columns 32 and 33 continues to increase the air-loading pressure in chamber 20 until the header pressure returns to normal. The pressure drop across valve 29 and consequently flow of control air therethrough is variably proportional to the deviation, and the pressure of the control air represents a time summation of the deviation of the header pressure from its normal value.

For reasons above stated, the valve 29 is only slightly open and tank 30 is large enough to insure that the above-described reset action shall proceed slowly.

In practice, it has been found that with valve 29 open to such position at which there is at most only slight overshooting by the steam pressure, the readjustment of fuel flow to boiler 10 in response to large variations in load thereon has been undesirably slow. Quickly to return the pressure to normal for such large abrupt deviation in load, it would be required that an operator further open valve 29 temporarily to speed up the reset action and then return the valve to its original position as the deviation is reduced to preclude overshooting as normal header pressure is approached. This original position is suitable for subsequent small changes in load with corresponding small changes in header pressure. Thus far described, the controller 12—34 is similar to that disclosed in aforementioned U. S. Patent 2,679,979.

In accordance with the invention, the proportionality between the rate of the reset action and the header pressure deviation is modified by providing that the path from chamber 20 to chamber 31 and tank 30 shall be of impedance varying as a function of the pressure difference between chamber 20 and chamber 31. Specifically in Fig. 1, a second path is provided in shunt relation to valve 29: this second or auxiliary path includes valve 35 and a liquid trap comprising a U-shaped tube 36 partially filled with a suitable liquid 37, for example, a light grade of lubricating oil, or a silicon base oil.

When the control system heretofore described is in equilibrium, that is to say, when the steam pressure in header 11 has not varied for a substantial time, the air-loading pressure in pipe 28 having been constant for some time, no pressure difference across valve 29 exists and no air flows therethrough. Suppose now that the steam pressure in header 11 changes very slightly with valve 35 partially open so that the air-loading pressure in pipe 28 changes enough to displace slightly the liquid 37 without air bubbling therethrough, since the volume of tube 36 is small compared to that of tank 30, the effect of this displacement of liquid 37 is negligible and reset action will be controlled substantially solely by the position of valve 29.

Now suppose that the steam pressure in header 11 changes abruptly by a substantial amount: the resultant change in air-loading pressure in pipe 28 causes air to bubble through liquid 37 in passing to or from tank 30, depending upon whether the change in steam pressure in header 11 was a decrease or an increase respectively. It will be apparent that whenever changes in air-loading pressure in pipe 28 are great enough to cause air to bubble through liquid 37, the effect of tube 36 is to increase the rate of the reset action by an extent dependent upon the setting of valve 35 and the pressure-differentials across valve 29 determined by the setting of screw 38 which determines the amount of liquid 37 effectively in tube 36.

In brief, the resistance of the flow path between chamber 20 of the controller, on one hand, and the tank 30 and chamber 31, on the other hand, is varied in two steps, the resistance depending upon whether the existing deviation of header pressure, and therefore the pressure drop across valve 29, is sufficient to produce flow in the supplemental shunt path provided by valve 35 and liquid trap 36. Additional steps of variation of resistance for increasing magnitudes of this pressure difference may be provided by adding a corresponding number of paths in shunt to valve 29, each with a valve 35 and a liquid trap biased by the liquid column to permit transfer of air at different predetermined pressure differences.

The fuel-controller unit controlled by the air-loading pressure may be of the magnetic-balance type more fully described in aforementioned U. S. Patent No. 2,679,979. Specifically, it comprises a diaphragm 39 to one side of which the air-loading pressure is applied. The pneumatic force on diaphragm 39 is balanced by an electromagnetic force from current produced by tachometer generator 40 whose voltage is proportional to the speed of rotation of feeder 41 supplying coal to pulverizer mill 42 from which the powdered coal is carried to boiler 10 by auxiliary combustion air from blower 43. Tachometer generator 40, feeder 41, mill 42, and blower 43 may be of any suitable known type.

The aforesaid electromagnetic force results from the flow of current from tachometer generator 40 through coils 44, 45, 46 and 47 of the magnetic balance. Coils 45 and 47 are mounted on stationary frame 48, and coils 44 and 46 are carried by lever 49 rotatably mounted by pivot 50 on frame 48. Current flowing through the aforesaid coils will tend to cause counterclockwise rotation of lever 49, as shown in Fig. 1, about pivot 50 and the resultant force is applied to diaphragm 39 through push rod 51 to balance the air-loading pressure on the diaphragm when there is correspondence between air-loading pressure and fuel flow as measured by tachometer generator 40. The fuel flow for a given air-loading pressure may be adjusted by varying the rheostat 52.

Upon unbalance between the air-loading pressure and the magnetic forces of coils 44 to 47, lever 49 of the balance carrying the movable contact 53 of a reversing switch for motor 56 rocks in one direction or the other to effect engagement of contact 53 with one or the other of the fixed contacts 54, 58 to energize motor 56. The motor 56, so controlled, varies the setting of a variable speed drive between the fuel feed drum 41 and its actuating motor 60.

Specifically, the motor 56 when energized shifts the position of idler 62 between the driving and driven cones 61, 63 of the variable speed mechanism. Thus, change in the air-loading pressure in line 28 causes a corresponding change in the rate of supply of fuel to the furnace.

In brief résumé of Fig. 1, a responsive device 12 responds to a change in the condition being controlled (the steam pressure in line 11) to change the setting of a control member 19 to vary the magnitude of a control force or quantity (air-loading pressure in line 28) substantially in proportion to the change in the controlled condition. This control force is applied to vary the supply of an agent or agents (fuel) affecting the magnitude of the condition (steam pressure of line 11) in proper sense to reduce or limit the deviation from normal of the controlled condition. The control force is also effective to react upon the control member 19 to effect further change in setting of the control member in sense to reduce the deviation of the controlled condition and at rate (provided by restrictions 29, 35, tank 30 and biasing liquid 37) which is proportional to the deviation, the proportionality factor having two values, the lower determined by the setting of valve 29, or equivalent restriction, and the higher determined by that setting and by the impedance of the non-linear resistance path including valve 35 and liquid 37.

Figure 2:
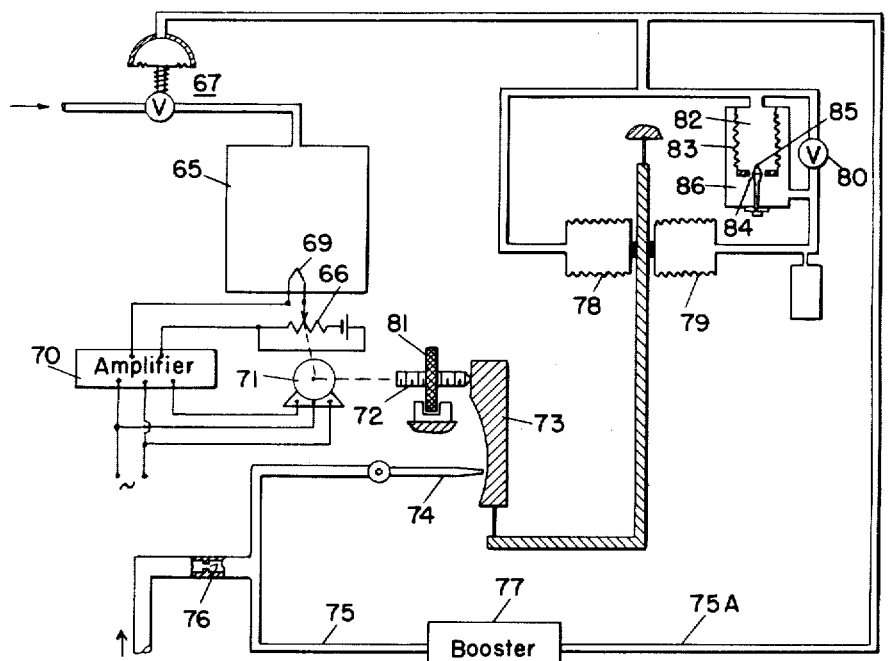
Fig. 2 is a diagrammatic view of a pneumatic control system embodying a modification of the invention shown in Fig. 1.

In Fig. 2, there is shown another form of pneumatic controller generally of type shown in copending application, Serial No. 747,925, now U. S. Letters Patent 2,507,606, modified to include the present invention. Upon change in temperature of the oven 65, the change in output voltage of thermocouple 69 unbalances a self-rebalancing system or network including a slidewire 66. Various suitable types of self-balancing systems are shown in Williams Patent 2,367,746. An amplifier 70 in response to this unbalance effects control of a reversible motor 71 to effect a rebalancing adjustment of the slidewire 66 and concurrently adjusts the threaded member or screw 72 to change the position of the baffle plate 73 with respect to an air nozzle 74. The change in the leakage of air from the nozzle 74 causes a change in pressure in the control line 75 supplied with air from a suitable source (not shown) through restriction 76. The change in pressure, preferably amplified by a booster 77 such as disclosed in aforesaid U. S. Patent 2,507,606, is applied to the pneumatically-controlled valve 67 to vary the supply of gas or other fuel to the oven 65. The change in control pressure through the bellows or Sylphon 78, or equivalent device, repositions the baffle 73 so that for each temperature of the oven 65, within the throttling range, there is a corresponding position of the valve 67, so affording a proportional control action.

Reset action is provided by a second bellows 79 acting in opposition to bellows 78 and in communication with the control line 75 (or 75A) through the flow resistance or restriction afforded by a valve 80 manually adjustable to set the rate of reset action. For reasons above discussed in connection with Fig. 1, in absence of the invention, this valve should be set for high flow resistance so that the reset action will not cause objectionably excessive overshooting of the control point, even at small temperature changes. As more fully set forth in aforesaid U. S. Patent 2,507,606, the control point is predetermined by a manual setting of the nut 81 for the actuating screw 72 of baffle 73. When the valve 80 is so set in avoidance of overshooting, if there occurs a large abrupt change of oven load, more rapid return of the oven temperature to the control point may be obtained if the operator manually temporarily increases the opening of valve 80, and as the furnace temperature approaches the control point, the operator must reduce the opening of valve 80 to prevent overshooting. This need for manual supervision of the rate of reset action is obviated in the system of Fig. 2 in manner analogous to Fig. 1.

In brief, there is provided, in shunt to the reset control valve 80, a second flow path whose resistaance varies inversely with and due solely to the pressure drop across the valve 80. Specifically, there is provided a chamber 82 defined by a bellows, diaphragm or like pressure-responsive element 83 having a preselected spring gradient and provided with a port or opening 84 coacting with valve 85. The communication between the chamber 82 on one side of valve 80 and the chamber 86 on the other side of valve 80 is controlled by valve 85 and the port opening for this valve depends upon the difference in pressure between the chambers 82 and 86 as acting upon the movable wall of bellows 83. Thus, the rate at which the reset action is effective to move the baffle 73 of the controller for a given range of pressures across the valve 80 depends upon the preselected shaping of the valve 85 and its seat. Since two flow paths to the reset bellows 79 are provided, the law of the reset action can be changed by changing the setting of valve 80 in one of these paths. In general, the greater the thermal lag of the oven 65, the smaller the opening of valve 80 should be in order that the joint non-linear reset action as provided by valves 80 and 85 shall return the furnace temperature to the control point in minimum time without objectionable or sustained overshooting. As in the aforesaid U. S. Patent 2,507,606, a storage tank may be connected to the control air system between valve 80 and bellows 79 to supplement, if necessary, the air storage capacity of the reset control portion of the controller.

Figure 3:
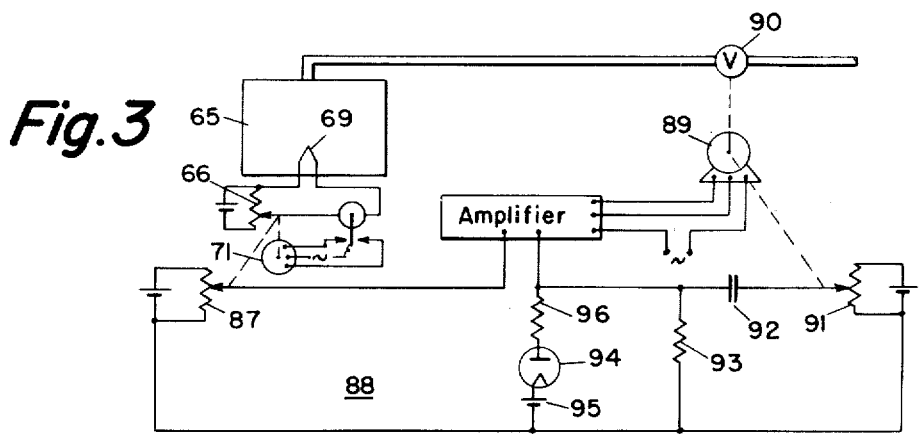
Fig. 3 is a schematic diagram of an electrical control system embodying a further modification of the invention shown in Fig. 1.

In Fig. 3, there is disclosed a control system generally of type shown in copending application, Serial No. 149,775, now U. S. Letters Patent 2,666,170, modified in accordance with the present invention to include a reset control action whose rate is made a non-linear function of deviations of the controlled variable. Upon change in temperature of the oven 65, the change in output of the thermocouple 69 unbalances a network including slidewire 66 which in response to the unbalance is readjusted by motor 71 to restore balance. Concurrently with adjustment of the rebalancing slidewire 66, there is effected concurrent adjustment of the slidewire 87 of a control network 88. The resulting unbalance of control network 88 is utilized to effect energization of motor 89 for adjustment of valve 90 to extent determined by the change in position of the slidewire 66 or 87. The motor 89 also correspondingly changes the setting of the rebalancing slidewire 91 of network 88 so that as thus far described the control of fuel supply valve in response to oven temperature-changes is a proportional control.

As more fully set forth in aforesaid U. S. Patent 2,666,170, the capacitor 92 and resistor 93 of network 88 provide a "reset" control action. The voltage or electrical pressure-drop across the resistor 93 corresponds with the air-pressure drop across reset contol valve 80 of Fig. 2 and reset control valve 29 of Fig. 1. To provide, in accordance with the present invention, a varying proportionality between the rate of reset action and the deviation of the controlled variable, there is provided in shunt to resistor 93 a conductive path whose resistance depends upon the voltage drop across the resistor 93. Specifically, this shunt path includes a resistor 94 which may be a varistor, thyrite resistor, a diode, or other resistance element having the characteristic that its resistance is an inverse, non-linear function of the potential-difference or voltage supplied to it. To exclude the action of this resistor at small deviations of the controlled variable, in analogy to the liquid-trap bias of Fig. 1, there may be provided an electrical bias by battery 95, or equivalent, which with the diode provides electric switching action to open the shunt path. This shunt path may also include, when necessary, a resistance 96 of high magnitude comparable to that of resistance 93. Thus, as in the two preceding modifications, there is provided, in shunt to an element of the reset control across which there exists pressure difference corresponding with the deviation, a conductive path whose resistance varies as a non-linear function solely of that pressure difference. There is thus simply provided an automatic change of the rate of the reset control action.

Actually, as fully set forth in the aforesaid U. S. Patent 2,666,170, the control network 88 of Fig. 3 may be more complex to provide proportional control and reset action both above and below a control point. In such case, the electrical pressure drop across the shunt path including resistors 94 and 96 is of reversible polarity and therefore if either resistor is asymmetrically conductive, it should be shunted by a similar resistor oppositely poled and biased so to provide for conduction of current for both polarities of the pressure drop or voltage.

From the foregoing examples, it shall be understood the invention is not limited to the particular embodiments illustrated but that changes and modifications may be made within the scope of the appended claims. The term "pressure" is generically used in the claims to include electrical pressure, i. e. electromotive force, and fluid pressure.

What is claimed is:

1. In a control system including elements providing reset action, one of the elements being a flow-resistance element whose magnitude of resistance to flow of a medium predetermines the reset rate for said system, the improvement which comprises the provision in shunt to said resistance element of apparatus providing a supplemental flow path for the medium and including a variable flow-resistance element responsive solely to the pressure-difference across the first-mentioned flow-resistance element to decrease the resistance to flow of said supplemental path upon an increase of the pressure-difference across said first-mentioned resistance element for supplementing the flow of medium through said first-mentioned flow-resistance element.

2. In a control system including elements providing reset action, one of the elements being a first valve whose magnitude of resistance to flow of a medium predetermines the reset rate for said system, the improvement which comprises the provision in shunt to said valve of apparatus providing a supplemental flow path for the medium and including a variable flow-resistance element comprised of a second valve and a liquid trap, said variable flow-resistance element being responsive to the pressure-difference across said first valve to decrease the resistance to flow of said supplemental flow path upon an increase of the pressure-difference across said first valve for supplementing the flow of medium through said first valve and so vary the reset rate of the system.

3. A system as defined in claim 1 in which the first-mentioned flow-resistance element is a valve and in which said apparatus in shunt thereto includes two chambers separated by a member movable in response to said pressure-difference and providing said second-mentioned flow-resistance element.

4. A system as defined in claim 1 in which the first-mentioned flow-resistance element is electrical resistance means and in which said apparatus in shunt thereto includes at least one resistor element whose electrical resistance varies inversely with an applied voltage difference derived from across said electrical resistance means.

5. A controller including means responsive to changes of a controlled variable, a source of control pressure having a member moved by said responsive means to vary the control pressure in accordance with the magnitude of said variable, reset means for effecting further movement of said member during continued deviation of said variable from a desired control point in accordance with the time summation of said deviation including a pressure-responsive device coupled to said member, and a flow system between said responsive device and said source including a variable flow-resistance element whose resistance to flow varies in manner inverse to and in extent as determined solely by the pressure-difference across said element, said pressure-difference being the difference between the pressure within said device and the control pressure as varied by said member, said difference in pressure being a measure of the deviation of the controlled variable from said desired control point.

6. A controller including means responsive to changes of a controlled variable, a source of control pressure having a member moved by said responsive means to vary the control pressure in accordance with the magnitude of said variable, reset means for effecting further movement of said member during continued deviation of said variable from a desired control point in accordance with the time summation of said deviation including a pressure-responsive device coupled to said member, and a flow system between said responsive device and said source including a variable flow resistance element whose resistance to flow varies in manner inverse to and in extent as determined by the difference between the pressure within said device and the control pressure as varied by said member, said flow resistance element comprising a valve in series with a liquid trap.

7. A controller including means responsive to changes of a controlled variable, a source of control pressure having a member moved by said responsive means to vary the control pressure in accordance with the magnitude of said variable, reset means for effecting further movement of said member during continued deviation of said variable from a desired control point in accordance with the time summation of said deviation including a pressure-responsive device coupled to said member, and a flow system between said responsive device and said source including a variable flow-resistance element whose resistance to flow varies in manner inverse to and in extent as determined solely by the difference between the pressure within said device and the control pressure as varied by said member, said variable flow-resistance element comprising a valve continuously having high resistance to flow and in shunt thereto a second valve in series with a liquid trap permitting supplemental flow therethrough for pressures across said first-mentioned valve in excess of a predetermined value.

8. A controller as defined by claim 5 in which said element includes a throttling valve and in which a device responsive to said pressure-difference increases the opening of said throttling valve with increase of said pressure-difference.

9. Apparatus for producing a control quantity varying with the extent and duration of deviations from a predetermined magnitude of an independently varying quantity comprising means for varying the pressure of air in a chamber in accordance with said deviations, and means for further varying said pressure in accordance with a time summation of said deviations, said second means comprising an air tank, an air conduit connecting said tank and said chamber, a restriction in said conduit, a second air conduit connected in parallel relation to said restriction, a second restriction in said second conduit, and a liquid trap in said second conduit, said liquid trap comprising a U-tube and a quantity of liquid therein whereby said second conduit is effectively open only upon the pressure-difference across said first restriction exceeding a predetermined value determined by the liquid head of said trap.

10. In an automatic control system, means for producing a pressure-difference variable in response to deviations of a controlled variable from a control point, means for producing a reset action to return said controlled variable to said control point, said last-named means including a flow-resistance means, and means for varying the proportionality between the rate of reset action produced by said flow-resistance means and the deviation of said controlled variable from said control point comprising apparatus providing a flow path in shunt with said flow-resistance means and having a variable resistance element whose magnitude is decreased due solely to an increase in the pressure-difference across said first resistance, said flow path supplementing the flow through said flow-resistance means.

11. In an automatic control system, means for producing a pressure-difference variable in response to deviations of a controlled variable from a control point, means for producing a reset action to return said controlled variable to said control point, said last named means including a valve having flow resistance, and means for varying the proportionality between the rate of reset action produced by said valve and the deviation of said controlled variable from said control point comprising apparatus providing a flow path in shunt with said valve, said flow path including a valve and a liquid trap together providing a variable resistance element whose magnitude of flow resistance is decreased upon an increase in the pressure-difference across said first-mentioned valve, said flow path supplementing the flow through said first-mentioned valve.

12. A system in accordance with claim 10 in which the reset flow-resistance means is a valve and in which said variable resistance element includes at least two chambers separated by a member movable in response to said pressure-difference to vary the resistance of said element.

13. A system in accordance with claim 10 in which the reset flow resistance means is electrical resistance means and in which the flow path in shunt therewith includes at least one resistor element whose electrical resistance varies inversely with an applied electrical potential difference.

14. In a control system including elements providing reset action for the system, one of the elements being a first flow-resistance element whose magnitude predetermines one rate of reset action for said system, apparatus providing a closed supplemental flow path in shunt with said flow-resistance element, said flow path including a second flow-resistance element for predetermining a higher rate of reset action for said system by supplementing the flow through the first flow-resistance element, and pressure-responsive means for opening said supplemental flow path, said means being responsive solely to the pressure-difference across the first flow-resistance element and responding to a predetermined extent of pressure-difference to open said supplemental flow path.

15. In a control system including elements providing reset action for the system, one of the elements being a first flow-resistance element whose magnitude predetermines one rate of reset action for said system, apparatus providing a closed supplemental flow path in shunt with said flow-resistance element, said flow path including a second flow-resistance element for predetermining a higher rate of reset action for said system by supplementing the flow through the first flow-resistance element, and a liquid trap for opening said supplemental flow path, said liquid trap being responsive to the pressure-difference across the first flow-resistance element and responding to a predetermined extent of pressure difference to open said supplemental flow path, the predetermined extent of pressure difference across the first flow-resistance element being determined by the liquid head of said trap.

16. The control system of claim 14 in which said first and second flow-resistance elements are electrical resistance means and in which said pressure-responsive means includes a resistance element whose electrical resistance varies in inverse manner to that of the pressure-difference after the predetermined extent of pressure-difference is attained.

17. In a control system including elements providing reset action for the system, one of the elements being a flow-resistance element whose magnitude predetermines one reset rate for said system, apparatus providing a closed supplemental flow path in shunt with said flow-resistance element, and means in said supplemental flow path responsive solely to a predetermined pressure-difference across said flow-resistance element for opening said supplemental flow path to increase the reset rate for said system by supplementing the flow through the flow resistance element.

18. In a control system including elements providing reset action for the system, one of the elements being a flow-resistance element whose magnitude predetermines one reset rate for said system, apparatus providing a closed supplemental flow path in shunt with said flow-resistance element, and means in said supplemental flow path responsive to a predetermined pressure-difference across said flow-resistance element for opening said supplemental flow path to increase the reset rate for said system by supplementing the flow through the flow-resistance element, said means comprising a liquid trap and a second flow-resistance element in series therewith, said predetermined value of pressure-difference being determined by the liquid head of said trap.

19. The combination of claim 17 in which said flow resistance element is an electrical resistance means and in which said means is an electric switch responsive to the potential difference across said electrical resistance means.

20. The combination of claim 17 in which the flow resistance element is an electrical resistance means and in which the supplemental path includes a resistor and said pressure-responsive means comprises a diode and a biasing cell connected in series.

21. A controller including means responsive to changes of a controlled variable, a source of control pressure having a member moved by said responsive means to vary the control pressure in accordance with changes of said variable, reset means for effecting further movement of said member during continued deviation of said variable from a desired control point in accordance with the time summation of said deviation including a pressure-responsive device coupled to said member, and apparatus providing a flow path between said responsive device and said source, said flow path including a flow-resistance structure whose resistance to flow is variable, said flow-resistance structure being responsive solely to the pressure-difference between the pressure of said device and the control pressure as varied by said member to vary its flow resistance.

22. The combination of claim 21 in which said flow-resistance structure is comprised of a flow-resistance element and apparatus providing a supplementary flow path in shunt therewith having a second flow-resistance element, the resistance to flow of said second element being variable solely in responsive to the extent of pressure-difference across said first flow-resistance element.

23. The combination of claim 21 in which said resistance structure includes two chambers separated by a member movable in response to said pressure-difference to vary the flow-resistance of said structure.

24. In a control system having elements providing reset action, said elements comprising structure providing a first air-flow path having a flow-resistance element establishing a reset rate of magnitude dependent upon the magnitude of resistance to air flow through it, and apparatus providing a second air-flow path in shunt with said flow-resistance element and including a variable pressure-responsive flow-resistance means for varying the air-flow resistance through said second air-flow path, said variable flow-resistance means being responsive solely to the pressure-differential across said flow-resistance element for establishing a higher reset rate for the system.

25. In a control system having elements providing reset action, said elements comprising means providing a first air-flow path having a flow resistance establishing a reset rate of magnitude dependent upon the magnitude of resistance to air flow through it, and apparatus providing a second air-flow path in shunt with said flow-resistance element, said second air-flow path being normally closed by a body of liquid therein, said body of liquid having a head preventing air flow therethrough until a differential of air pressure across said flow-resistance element exceeds the head of liquid, the resultant flow of air through said second air-flow path changing the reset rate of the system.

26. In a control system for minimizing the deviation of the magnitude of a condition from a control point, said system including elements providing reset action for the system, one of said elements being a first flow-resistance element whose magnitude of resistance to flow predetermines a rate of reset action for said system, apparatus providing a normally closed supplemental flow path in shunt with said flow-resistance element, said supplemental flow path including a second flow-resistance element, and means responsive solely to the magnitude of the deviation of the condition under control from the control point for opening said supplemental flow path for modifying the rate of reset action by said second flow-resistance element in accordance with the magnitude of the deviation.

References Cited in the file of this patent

UNITED STATES PATENTS

| | | |
|---|---|---|
| 1,923,127 | Veenschoten | Aug. 22, 1933 |
| 2,119,061 | Stein et al. | May 31, 1938 |
| 2,170,418 | Mabey | Aug. 22, 1939 |
| 2,214,290 | Ward | Sept. 10, 1940 |
| 2,264,261 | Erbguth | Nov. 25, 1941 |
| 2,277,768 | Mason | Mar. 31, 1942 |
| 2,312,711 | Harrison | Mar. 2, 1943 |
| 2,360,889 | Philbrick | Oct. 24, 1944 |
| 2,476,104 | Mason | July 12, 1949 |
| 2,705,017 | Lewis | Mar. 29, 1955 |

UNITED STATES PATENT OFFICE
CERTIFICATE OF CORRECTION

Patent No. 2,762,385 September 11, 1956

John J. Smerke

It is hereby certified that error appears in the printed specification of the above numbered patent requiring correction and that the said Letters Patent should read as corrected below.

Column 10, line 38, for "responsive" read --response--.

Signed and sealed this 22nd day of October 1957.

(SEAL)
Attest:
KARL H. AXLINE
Attesting Officer

ROBERT C. WATSON
Commissioner of Patents